United States Patent
Signorelli (12) 
(10) Patent No.: US 6,616,370 B1
(45) Date of Patent: Sep. 9, 2003

(54) PANEL INSPECTION PLUG AND METHOD FOR ASSEMBLING AND USING SAME

(76) Inventor: John A. Signorelli, 135-14 Cronston Ave., Belle Harbor, NY (US) 11694

( * ) Notice: Subject to any disclaimer, the term of this patent is extended or adjusted under 35 U.S.C. 154(b) by 0 days.

(21) Appl. No.: 09/760,798

(22) Filed: Jan. 17, 2001

(51) Int. Cl.[7] ............................................... E02D 29/14
(52) U.S. Cl. ............................................ 404/25; 52/19
(58) Field of Search .................... 404/25, 26; 52/19–20

(56) References Cited

U.S. PATENT DOCUMENTS

| | | | |
|---|---|---|---|
| 140,893 A | | 7/1873 | Craven |
| 4,257,697 A | * | 3/1981 | Yamazaki et al. .......... 396/447 |
| 4,378,818 A | * | 4/1983 | Cormier, Jr. ................. 137/523 |
| 4,597,692 A | | 7/1986 | Gruenwald |
| 5,027,849 A | * | 7/1991 | Diesener .................. 137/236.1 |
| 5,152,662 A | | 10/1992 | Hirst et al. |
| 5,361,784 A | * | 11/1994 | Kinder ......................... 131/231 |
| 5,827,007 A | | 10/1998 | Barton et al. |
| 6,048,047 A | * | 4/2000 | Terasawa et al. ............. 347/30 |
| 6,066,117 A | * | 5/2000 | Fox et al. .................... 604/249 |
| 6,102,641 A | * | 8/2000 | Hildebrandt ................ 411/369 |

FOREIGN PATENT DOCUMENTS

CA 2156312 2/1997
GB 297006 9/1928

OTHER PUBLICATIONS

An European Search Report dated May 27, 2002, issued in the International patent application No. PCT/US01/43155.

* cited by examiner

*Primary Examiner*—Heather Shackelford
*Assistant Examiner*—Sunil Singh
(74) *Attorney, Agent, or Firm*—Morgan & Finnegan, LLP (57) ABSTRACT

Method and assembly for inspecting the contents of a connection box or a utility system such as a sewer, telephone electrical, gas etc. via an inspection plug. The inspection plug provides an inspection port and is insertable into a hole in a panel and is attachable to the panel by fixing elements such as a nut assembly, a locking mechanism, prongs, etc. The inspection plug may include a body, a peripheral shoulder, and a resiliently braced cap pivotally mounted in the body to close the inspection port. The peripheral shoulder supports the plug in place in the panel. The cap normally closes the inspection port, but is yieldably openable to allow an inspection probe or other device to gain access to the internal atmosphere for testing within the utility system or electrical connection box. The interior space of the body may contain a gel material, and the cap can be substituted with a resilient closure member having self-sealing openings therein for receiving an inspection probe. The plug may be adjacent to a gas detection alarm system.

35 Claims, 11 Drawing Sheets

PANEL INSPECTION PLUG AND METHOD FOR ASSEMBLING AND USING SAME

FIELD OF THE INVENTION

This invention relates to a panel inspection plug that may be operated to provide an entrance through which a user may insert an inspection probe, device or device attachment into an area requiring inspection, testing and/or sampling, and more particularly to such an inspection plug that can be adapted to fit into an opening or hole within the panel to allow access to an interior environment covered by the panel.

BACKGROUND OF THE INVENTION

Inspecting a utility system, such as in the electric, gas, telephone, chemical and sewer industries, can be a difficult task. Utility workers routinely inspect, test, repair and sample the contents of underground utility systems which are designed as subsurface structures. Utility workers generally enter or gain access to these subsurface structures through an opening at the surface that is normally covered by a panel or manhole cover. Prior to entering the underground structure, the manhole cover typically must be removed and atmospheric tests performed on the interior environment to ensure that the underground structure is safe to enter, e.g., that little or no toxic substances or combustible gases are present. The inspection may be performed with air and fluid monitors utilizing probes, tubes, etc., that may be used to gather or detect unidentified matter and gasses. Most panels or manhole covers are made of solid cast iron and can weigh from 150 to 450 pounds. Accordingly, removing manhole covers and inspecting the contents of the internal atmosphere can be physically exhausting and dangerous, often resulting in back, leg, or arm injury.

To gain access to the interior environment, manhole covers are physically dislodged and at least partially removed from the opening to permit the entry of probes, tubes or other devices. Removing a manhole cover ordinarily requires at least two able-bodied field crew members and specialized tools such as a four to eight foot crow bar, a 10 pound hammer, a sledge hammer, and two manhole hooks. The manhole hooks are normally used to pull the panel or manhole cover from its support structure. However, oftentimes the manhole cover is stuck tightly to its structure or receiving frame due to foreign matter such as dirt, rocks, roadway tar, etc. The specialized tools are used to pry open or pound the cover and frame thereby breaking the seal caused by the foreign matter so that the cover can be successfully dislodged or removed with the manhole hooks. Upon completion of an inspection, workers must return the manhole cover to its support structure by using the manhole hooks and other tools. The repeated manhole cover manipulation, required for even minor utility system inspections, can cause severe or permanent injury to utility workers.

Utility companies, especially electric utilities, occasionally experience explosions within their structures. The explosions may be caused, for example, by electric cable failures which may short creating high energy arcing between the cable's conductors. The arcs may decompose air, water, insulation, or other material in the structure to a flammable or explosive gaseous state. For example, decomposition products such as hydrogen, methane, acetylene, propane, etc. may combine with the underground atmosphere and/or aboveground air entering the structure to create a combustible atmosphere or mixture. As the manhole cover or panel is dislodged, air may suddenly rush into the internal atmosphere and mix with the internal gases to create a combustible gas that may come into contact with an ignition source such as the arc or other intense heat source thereby causing an explosion and/or fire (so-called "backflash"). Moreover, the explosion may also start a fire within the system. The explosion and resulting fire form large amounts of dangerous toxic gases such as carbon monoxide. Because these structures may be connected to other structures through passageways or ductways, the gases may travel to adjacent utility structures and through service ducts thereby entering buildings and homes and endangering people and animals.

A utility worker or other individual who must enter a utility system is typically unaware of the contents of the internal atmosphere. Combustible or toxic gases may be present and explode without warning causing serious injury to individuals in the area. Accordingly, a need exists for a device and method for inspecting the contents of an internal atmosphere that does not require removing or dislodging a panel or manhole cover. The need also exists for increasing the accuracy of the inspection and eliminating "backflash".

Similarly, electrical connection boxes such as Electric Main Service Disconnect Switch Enclosures, found in most buildings, may contain combustible or flammable gases. In response to an emergency, an operator such as a firefighter typically operates a main electrical switch or circuit breaker that is located within such a box to disconnect the electricity to the building. However, by turning off the electric supply to the building, an operator may unknowingly produce sparks or arcing between the two internal metal contacts of the switch. This sparking or arcing occurs at the moment the contacts separate from each other due to the potential difference between the metal contacts. The resulting spark or arc may ignite combustible gases that may exist within the connection box and create a dangerous explosion that can severely injure the operator of the switch and damage surrounding equipment. As a result, the operator may be required to remove a cover, panel or door attached to the switch enclosure so that the operator can determine whether it is safe to disconnect the electricity to the building. To remove the cover, panel or door, screws may have to be removed thereby consuming valuable time in an emergency situation. Thus, a need exists for quickly and accurately analyzing the internal atmosphere of a utility system connection box without disassembling and opening its panel, door, cover, or other enclosure in a time consuming manner.

SUMMARY OF THE INVENTION

In accordance with the present invention an inspection plug is provided that can be removably or fixedly inserted into an environment-defining barrier or panel, such as a manhole cover, wall or closure of a containment system. Typically, the barrier or panel includes an opening or hole into which the inspection plug can be inserted. In illustrative embodiments, the plug provides an inspection port and a closure member for the port, the closure member being sufficiently yieldable to permit the insertion of a probe through the inspection port and returning to a closed state after the probe has been extracted. In one embodiment, the inspection plug may include a peripheral shoulder, an openable or movable cap, and a body such as a cylindrical member. The cap may be hingably attached to the shoulder and resiliently biased by normally a spring or spring-like member into a closed position to seal the cylinder opening. In yet other embodiments, the closure member may comprise a resilient insert or cap having openings through which a probe may be inserted, in which the openings automatically seal to its normally closed position when the probe is removed.

That is, the present invention provides an inspection closure assembly having a panel with an opening, an inspection plug received within the opening and extending therethrough. The plug has a plug body with a passageway extending between first and second ends thereof and terminating at the first end in a probe-receiving port. The assembly also may include a closure member, which is yieldable to a degree sufficient to admit the insertion of an object such as an inspection probe through the port, for the probe-receiving port.

The present invention also provides an inspection closure assembly receivable within a panel opening that extends through a panel. The assembly includes a plug body having a passageway extending between the first and second ends thereof and terminating at the first end in a probe-receiving port. The assembly also may include a resiliently biased cap member oriented at least partially within the probe-receiving port, the cap member being pivotally oriented about a rod-shaped member mounted in the plug body and being yieldable to a degree sufficient to admit the insertion of an object, such as an inspection probe, through the port.

The present invention also provides a method of using an inspection plug that includes a resiliently movable cap member, which is located at a port opening and may be within a passageway defined by a cylinder, for closing and opening the probe receiving port. The cap is preferably biased toward the outer surface of the panel such that inward pressure on the cap causes it to open to permit the entrance of a probe into the probe-receiving port or passageway. In addition, the inspection plug assembly may contain a gel material, wherein the cap or a part thereof is made of an elastic or flexible material and contains one or more slits. The cylindrical member contains an elastic or flexible enclosure at the bottom of the inspection plug containing one or more slits to contain and house the gel material.

The present invention also provides a method of assembling a panel with an inspection plug having first and second surfaces and an opening extending therethrough. The method includes providing an inspection plug having a plug body defining therein a passageway extending between the ends thereof and terminating at one of the ends in a probe-receiving port, and having a resiliently movable closure member located within the passageway for closing and opening the probe receiving port. The method may additionally include inserting a portion of either of the ends of the body into the panel opening, and securing the plug in the panel opening.

The present invention also provides a method of employing an inspection plug having a plug body with a first end, a second end and defining therein a passageway extending between the ends and terminating at the first end in a probe receiving port. The inspection plug also may include a resiliently movable cap member located at least partially within the passageway for closing and opening the probe receiving port. The method includes operating the cap to permit the entrance of a probe into the probe receiving port, and inserting the probe into the passageway of the inspection plug.

The plug and cap assembly can be threaded at one extreme to allow attachment to the panel by a lock washer and nut. Alternatively, attachment may be by flexible locking prongs, a locking mechanism, rivet, friction, etc.

The present invention also provides for the ability to quickly and easily inspect the contents within the structure by visual means such as with a camera/video system and thus not have the burden to removing or dislodging a heavy cover using cumbersome tools.

The present invention also provides a method for inspecting an internal atmosphere using an inspection plug for accessing the internal atmosphere.

The present invention also provides an inspection plug and alarm combination and a method for using same.

DETAILED DESCRIPTION OF THE INVENTION

Both the structure and operation of the preferred embodiments of the present invention will now be described in greater detail with reference to the figures.

Figure 1:
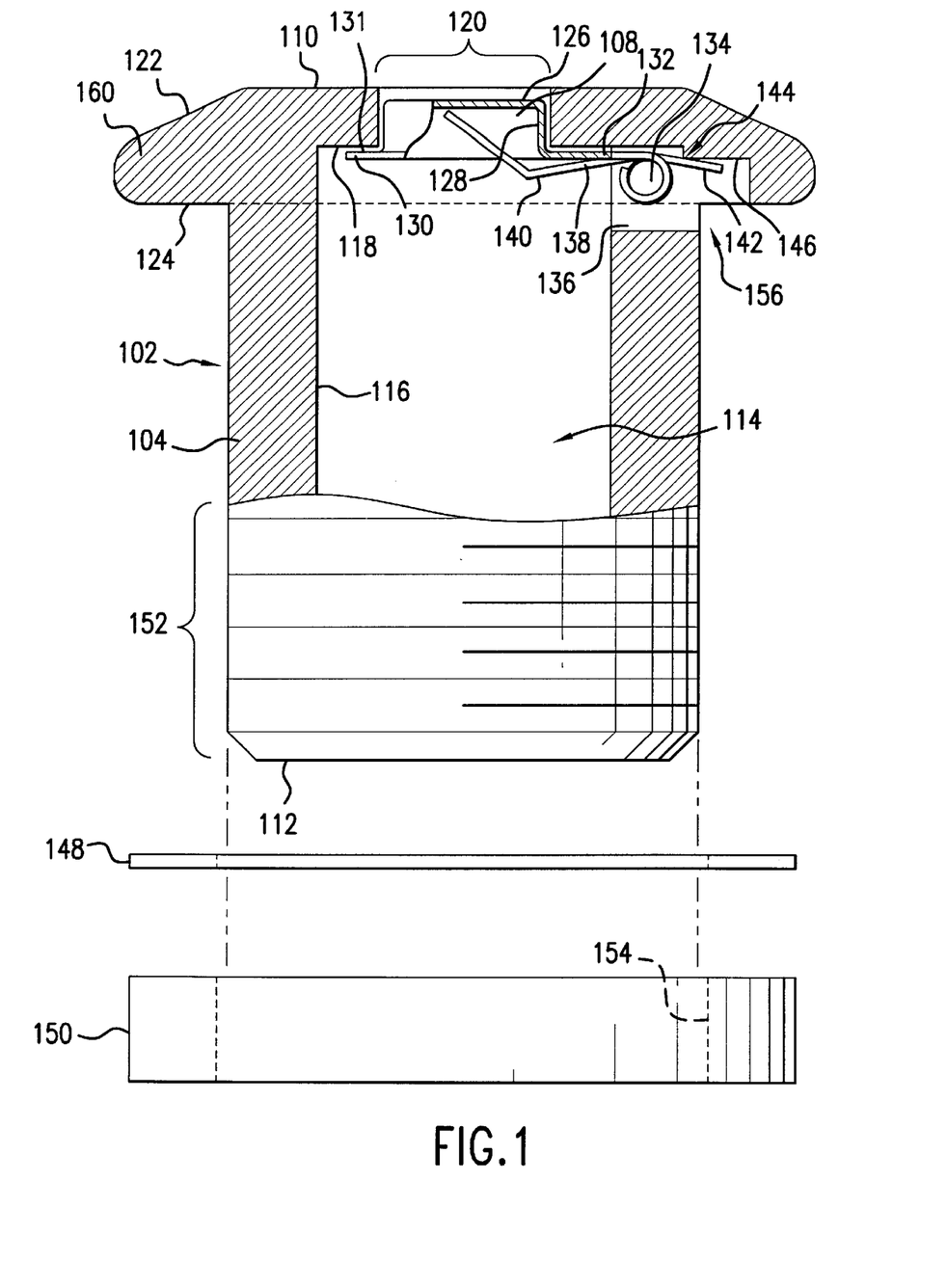
FIG. 1 is a side cross-sectional view of an inspection plug in accordance with the invention.

FIG. 1 illustrates the inspection plug, generally designated by reference numeral 102, in accordance with the present invention. The inspection plug is for attachment to a panel, such as a manhole cover, as will be described herein. In this embodiment of the invention, the inspection plug 102 is comprised of a body 104, a peripheral shoulder or outwardly directed flange 106, and an openable cap 108. The body 104, peripheral shoulder 106, and cap 108 may be made of plastic, stainless steel, aluminum, rubber, a composite material, or a combination of such materials that preferably are non-corrosive. The cap 108 is preferably made of stainless steel or aluminum alloy and may be formed by a stamping machine.

As shown in FIG. 1, the body 104 of the plug 102 is cylindrical having a top end 110, a bottom end 112, and a passage 114 extending axially through the plug between its ends and terminating at an internal ledge 118 proximate to the top end 110. The top end 110 of the cylindrical member has an inspection internal ledge 118 that defines an aperture 120 of smaller diameter than the passage 114. An inspection port 120 is sized for inserting an inspection probe or other device into and/or through the inspection plug 102. The length of the body 104 may vary depending on the thickness of the panel 300 (FIG. 3) to which the inspection plug 102 is to be attached, as illustrated in FIG. 4. Although described here as being cylindrical, the body 104 may be square, hexagonal, or any shape with a passage through it from one end to the other.

The plug has an external peripheral shoulder 106 extending radially outwardly from the accessible end of the plug. When installed on a panel such as a manhole cover, the shoulder 106 may have a tapered top side 122 designed to allow vehicle tires to ride over the inspection plug 102 with minimal impediment and to prevent pedestrians from tripping on the inspection plug 102. Preferably, the inspection plug can be installed flush mounted as shown in FIG. 4, that is, not protruding on the exterior side 302 (FIG. 3) of the manhole cover or panel. The underside 124 of the shoulder 106 supports the inspection plug 102 when attached to a panel and also helps to locate the inspection plug's placement in the panel port, opening or hole. The length of the plug may vary depending on the thickness of the panel 300 (FIG. 3) to which the plug 102 is to be attached. Inspection plugs used in electrical connection boxes, or other defined enclosures, which usually have thin walls, will be relatively short in length, e.g., about ¾ inch from the top end 110 to the bottom end 112. However, the plugs used in manhole covers will usually be longer in length, e.g., about 3 inches. Naturally, this invention can be miniaturized depending on the needs of the particular device requiring inspection.

Figure 2:
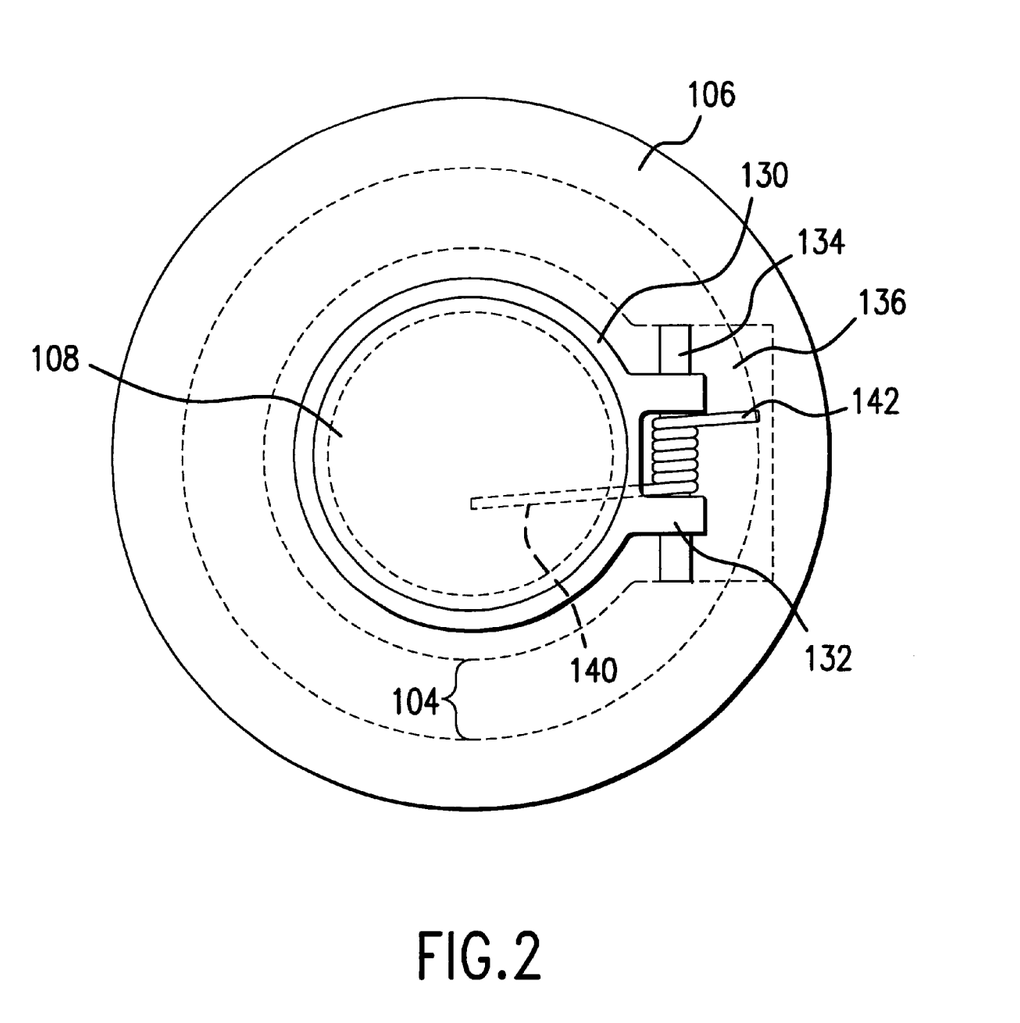
FIG. 2 is a plan view of the top of the inspection plug.

The openable cap 108 within the aperture 120 forms a hat-shaped body having a circular disc 126 sized for insertion into the aperture 120. The edge of the circular disc 126 curves downward and forms a cylindrical body 128 of about the same diameter as the circular disc 126. The bottom of the cylindrical body 128 curves outward into a radially extending rim 130 having a diameter greater than the aperture 120 and smaller in diameter than the passageway 114. A gasket may be fitted to the top side 131 of rim 130 to provide an improved seal between the cap 108 and the internal ledge 118 when the inspection plug 102 is not in use and its cap is in the normally closed position. A portion of the rim 130 extends laterally to form one or more pivot arms 132 as depicted in FIG. 2. The pivot arms 130 wrap partially around a spring pin 134 thereby creating a hinge axis. Preferably, two pivot arms 132 extend parallel to each other from the rim 130 to the spring pin 134 as illustrated in FIG. 2. In this embodiment, the cap 108 is hingably attached through the spring pin 134 to the cylindrical member. In other embodiments, the cap may be of a different shape, e.g., flat disk, square, hexagonal, etc.

The spring pin 134 is located in a spring compartment 136 located within a portion of the body 104. A spring 138 having an inner end 140 and an outer end 142 is wound around the spring pin 134 and cooperates with the cap 108. The inner end 140 of the spring 138 extends generally toward the center of the circular disc 126 and applies a resilient upward pressure against the underside of the circular disc 126 thereby causing the radially extending rim 130 to normally press against the internal ledge 118. Thus, the cap 108 is normally biased in a closed position as illustrated in FIG. 1. The outer end 142 of the spring 138 extends generally away from the cap 108 and contacts the edge 144 of a downwardly facing step 146 located in the spring housing compartment 136. The spring 138 may be made of stainless steel or music wire. Although described here in terms of a horizontally coiled spring mechanism, other spring-type embodiments may be used in the present invention to exert a force for facilitating closure of the cap.

The spring compartment 136 has a side slot 156 which facilitates access to the spring compartment 136. The spring 138 and spring pin 134 may be inserted into the spring housing compartment 136 through the side slot 156 during assembly of the inspection plug 102. The cap 108 can be inserted through the body 104 passageway 114 for assembly. The spring pin 134 is then attached by spot welding, liquid steel, glue, epoxy, or similar means to the sides of the spring housing compartment 136. FIG. 2 illustrates an appropriate position for the spring pin 134 in the spring housing compartment 136. Of course, the pin also can be threaded and screwed into a drilled and tapped hole in the body (not shown). If desired, the cap can be provided with a locking mechanism, such as a simple tab that can be pivoted into engagement with a slot in the way of the aperture 120 to prevent accidental depression of the cap. Alternatively, a locking tab can be pivotally mounted on the plug body for locking engagement with the cap.

Figure 3:
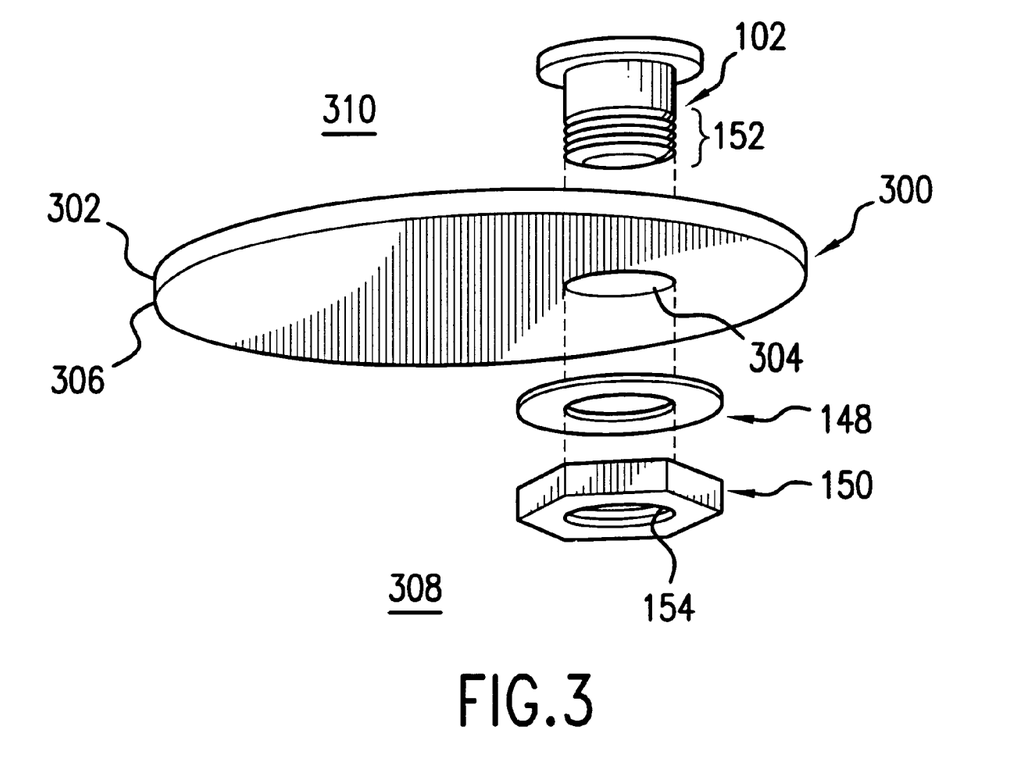
FIG. 3 is an exploded perspective view of the inspection plug, the nut assembly, and a manhole cover.
Figure 4:
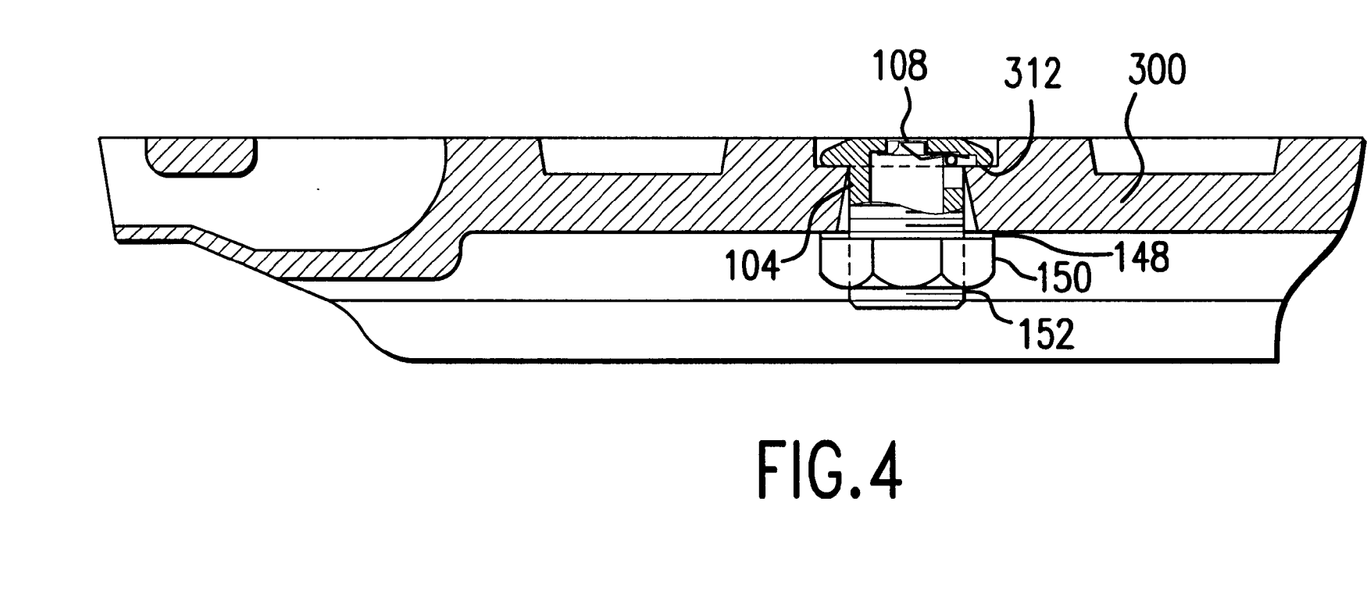
FIG. 4 is a cross-sectional side view of an inspection plug with a nut assembly attached to a manhole cover.

As shown in FIG. 3, the inspection plug 102 may be attached to a panel 300 in one of several ways. The term "panel" as used herein shall be understood in a relative sense and is intended to designate any movable or fixed partition, such as a manhole cover or connection box wall, that partially or totally obscures an area requiring inspection. The term "connection box" as used herein shall also be understood in a relative sense and is intended to designate a substantially enclosed box including, but not limited to, the following: electric meter service boxes, electric switchgear panels, metering closets, electrical throughputs, electric service shut-off switches, circuit breaker boxes, main breaker panels and transformer cubicles. The panel 300, as illustrated in FIG. 3 has an exterior side 302, an interior side 306, and a hole 304 having a diameter slightly larger than the diameter of the inspection plug body. The panel 300 also has a circular shelf 312, illustrated in FIG. 4, designed to accommodate the peripheral shoulder 106 of the inspection plug 102. The circular shelf 312 allows the peripheral shoulder 106 to be recessed or submerged in the panel 300. This embodiment minimizes disturbances, possible tripping, etc. created when automobiles or pedestrians pass over the plug.

The inspection plug 102 may also be attached to the panel 300 by force-fitting the plug 102 into the panel hole 304. This embodiment is preferred when the plug 102 is made of a soft or malleable metal or other relatively soft material. The plug 102 may also be affixed to the hole 304 in the panel 300 by glue, epoxy, liquid steel, mechanical crimping, or similar affixing arrangements.

The inspection plug 102 may be attached to the panel 300 by a nut assembly, which includes a washer 148, a nut 150, and optionally a gasket (not shown). In this embodiment, illustrated in FIGS. 3 and 4, the cylindrical member has a threaded exterior portion 152 near its bottom end 112. The nut 150 has a threaded bore 154 for engagably receiving the threaded exterior portion 152 of the cylindrical member. To attach the inspection plug 102 to the panel 300, the user inserts the bottom end 112 of the plug into the hole 304 in the panel 300 until the under-side 124 of the peripheral shoulder 106 contacts the exterior side 302 of the panel 300 at which point the threaded exterior portion 152 of the cylindrical member will extend into the internal atmosphere 308, which is the area requiring inspection. A gasket made of rubber, plastic, composite material, or other material, may optionally then be placed over the bottom end 112 of the plug 102 to improve the seal between the plug 102 and the washer 148 and/or nut 150. The washer 148 is then placed over the threaded exterior portion 152 of the cylindrical member, and the nut 150 is screwed onto the threaded exterior portion 152 of the cylindrical member of the inspection plug 102 thereby securing the inspection plug 102 to the panel 300 as illustrated in FIG. 4.

Figure 5:
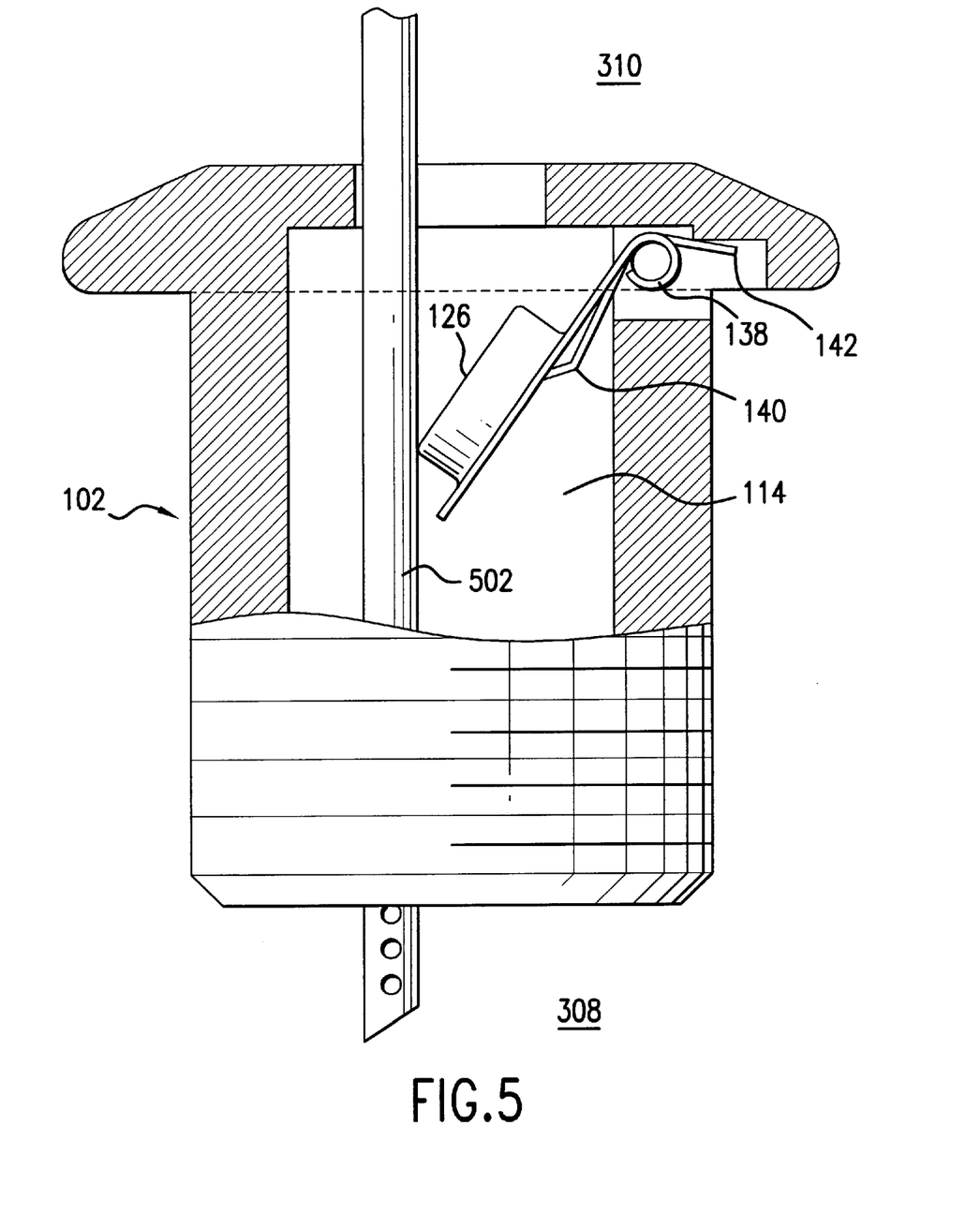
FIG. 5 is a cross-sectional side view of the inspection plug showing a probe inserted into the access port by depressing the cap.

To use the invention, as illustrated in FIG. 5, the user inserts an inspection probe 502 through the aperture 120 into the internal atmosphere 308. By applying pressure against the top edge of the circular disc 126, the spring force is overcome and the cap will open on its hinge axis. As it opens, the user may further insert the inspection probe 502 or other device through the inspection plug 102 and into the internal atmosphere 308. After the inspection probe 502 has been inserted to required depths, the user may inspect the contents of the internal atmosphere 308. After the inspection is complete, the probe is retracted from the inspection plug whereby the cap proceeds to its normally closed position by the force exerted by the internal spring member and seals the entranceway thereby substantially preventing dirt, water, or other contaminants from entering the structure.

Additionally or alternatively, the radius of the hole 114 in the body 104 may gradually decrease or taper from the top end 110 of the cylindrical member to the bottom end 112 of the cylindrical member thereby aiding in guiding the inspection probe 502 or other device through the hole 114 of the inspection plug 102 and into the internal atmosphere 308.

Figure 6:
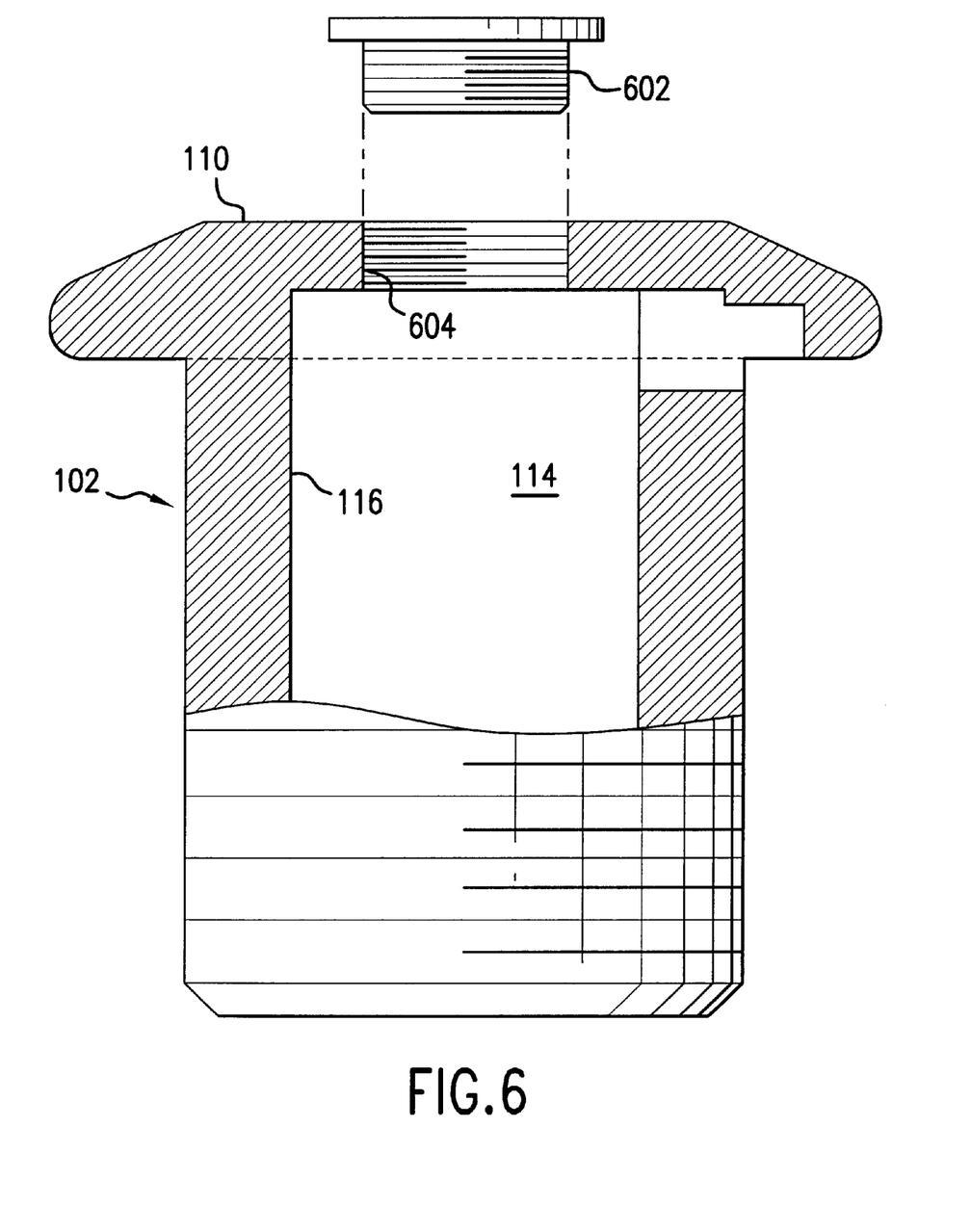
FIG. 6 is a cross-sectional exploded side view of an alternate embodiment of the inspection plug, with a screw cap closure.

In an alternate embodiment, illustrated in FIG. 6, the openable cap is a threaded insert 602 which may be unscrewed from the inspection plug 102 to allow the user to insert the inspection probe or other device into the hole 114. In this embodiment, the outer surface of the insert 602 is threaded to mate with interior threads 604 of the inspection port 120. To gain access to the interior environment, a user unscrews the insert 602 by hand, screwdriver, or other device, and removes it from the inspection plug 102. Once the inspection is complete, the user closes the inspection plug 102 by screwing the insert 602 back into the inspection plug 102.

Figure 7:
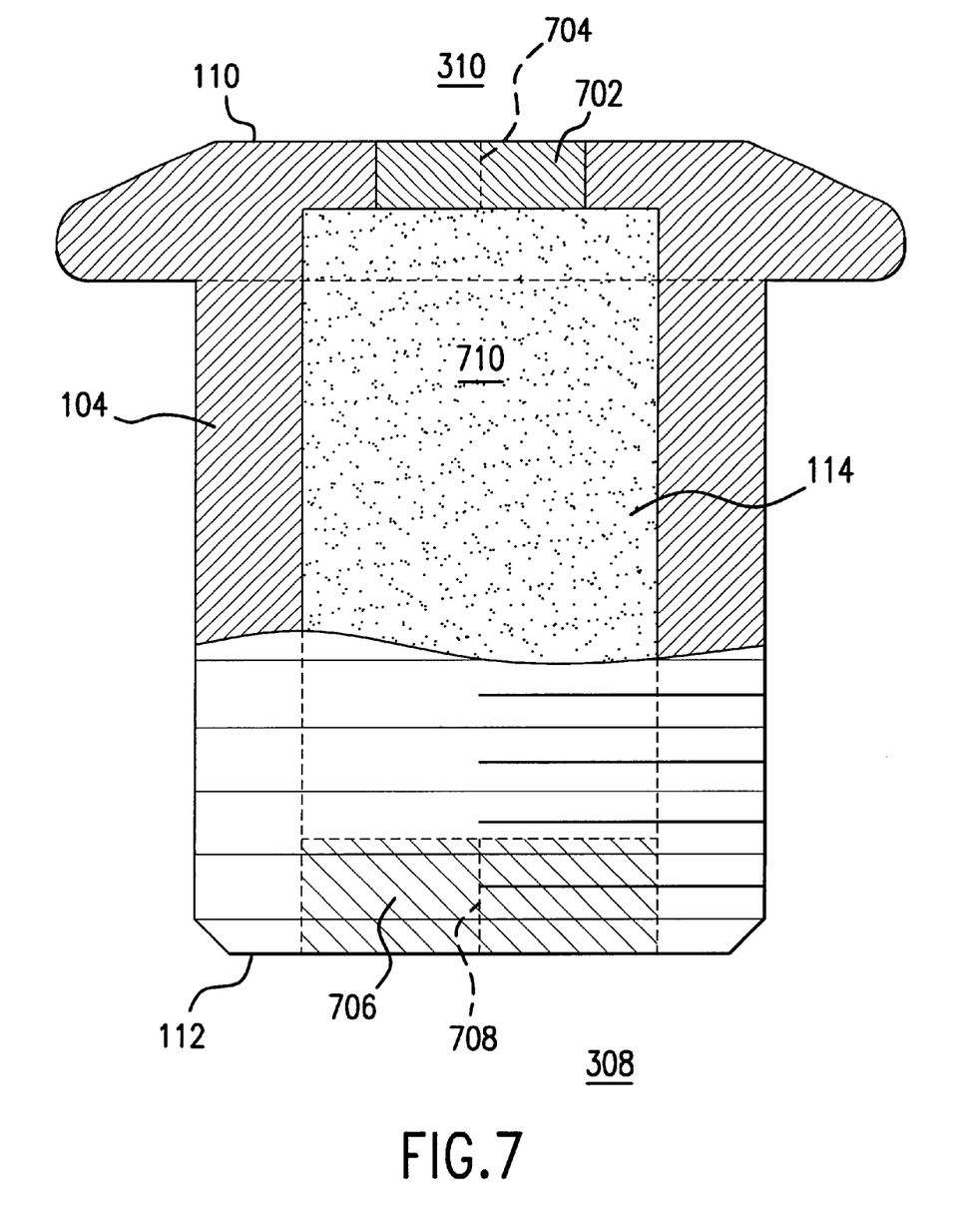
FIG. 7 is a cross-sectional side view of an alternate embodiment of the inspection plug, having a pliant port closure.

In the embodiment of FIG. 7, the interior of the plug body 104 is filled with a gel material 710, the purpose of which is to provide a probe-penetrable seal at the inspection plug. In this embodiment, the closure of the inspection port is an elastic or resilient flexible top insert 702 having one or more slits 704 sized for receiving inspection probes or other devices. The bottom end 112 of the body 104 has a similar elastic or flexible resilient insert 706 which normally substantially seals the hole 114 and similarly contains one or more slits 708 sized for receiving inspection probes or other devices. The gel material 710 occupies the volume within the hole 114 between the inserts 702 and 706. The interior space of the plug may be filled with the gel material 710 through either of these slits with a syringe or other device. Alternatively, one of the closure inserts may be put in place after the gel material 710 is loaded. In either case, the inserts house the gel to allow the user to insert and retract an inspection probe or other device through the inspection plug 102.

The gel material is preferably self-adhering or has other adhesive characteristics for sticking to the internal wall of the body and thereby minimizing flow or leakage while maintaining a paste-like consistency. The material can be formed of silicone polymers to form a silicone grease-like formulation such as silicone sealants. The gel material preferably has the following characteristics: water repellency, atmospheric and chemical resistance, good elasticity, and thermal resistance over a wide temperature range.

The flexible top insert described above also may be employed in non-gel embodiments of the present invention. The cap or top closure element may be made of an elastic or flexible material such as a foam, rubber, or neoprene material and fixed within the port 120 by glue, epoxy, or other adhesive. Alternatively, inwardly directed flanges at the periphery of the port 120 can be provided to securely locate a resilient or compressible top closure element within the inspection port.

Figure 8:
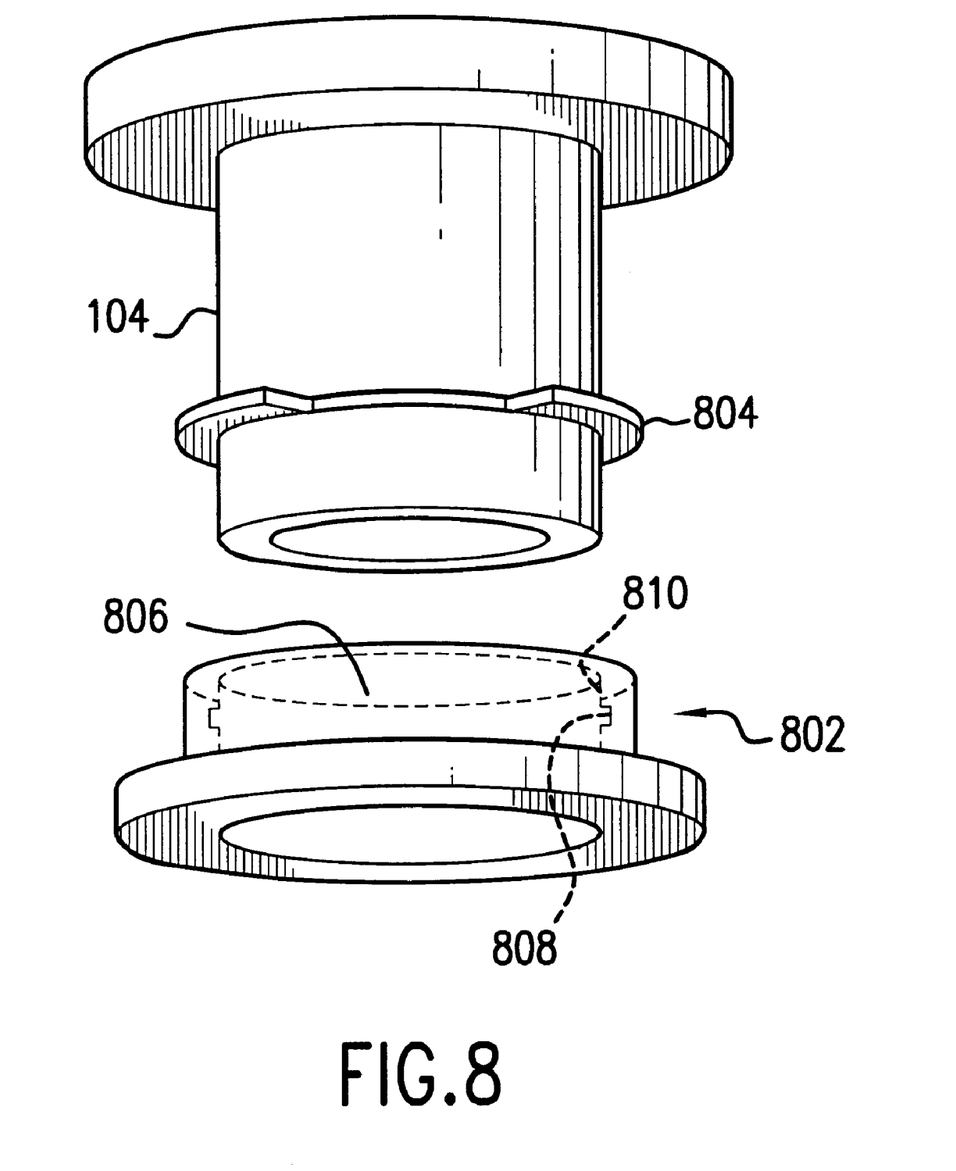
FIG. 8 is an exploded perspective view of an alternate embodiment of the inspection plug, showing a snap-ring attachment member.

In another embodiment, illustrated in FIG. 8, the plug body 104 may be secured to the panel 300 by a bayonet-type lock member 802. In this embodiment, the outer surface of the body 104 includes a plurality of radially extending tabs 804 at its lower end. A plurality of tab-mating slots 808 in the inner wall 810 of the lock member bore 806 are spatially aligned with the tabs 804. Of course, the tabs and slots can also reverse positions, with tabs on the lock member and complementary slots in the plug body. To attach the body 104 to the panel 300, the body 104 is inserted through the hole 304 in the panel 300, and the slots 808 on the lock member 802 are aligned with the tabs 804 on the body 104. The slots 808 receive the tabs 804, after which the inspection plug 102 may be rotated so that the tabs and slots are engaged.

Figure 9:
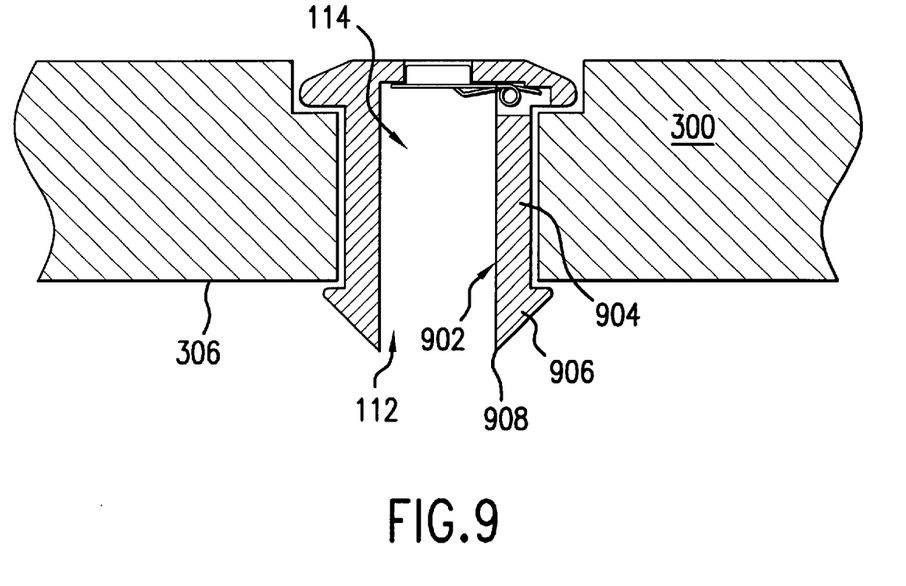
FIG. 9 is a cross-sectional side view of an alternate embodiment of the inspection plug, with a flexible prong attachment member.

In another alternative embodiment, illustrated in FIG. 9, the inspection plug 102 is attached to the panel 300 by flexible prongs 902 that are dimensioned to engage the underside of the panel and that radially compress as the plug is inserted through the panel hole. Once in place, the prongs snap outwardly into place. In this embodiment, the body 104 is formed with one or more inwardly compressible resilient prongs 902 extending from the exterior end to the interior end of the plug. Each prong 902 includes a shaft 904 terminating in a barb or clasp hook 906. The clasp hook 906 preferably tapers to a point 908 in the direction of the bottom end 112 of the body 104 to provide a camming surface for directing the prongs inwardly as the plug is inserted into the panel hole. Thus, as the inspection plug 102 is inserted into the panel hole 304, the clasp hook 906 will be forced inwardly causing the shaft 904 to yield radially inwardly. To that end, the plug body, or simply the prongs 902 are constructed of a resilient material such as spring steel or plastic, having strong elastic memory properties. Once the clasp hooks 906 pass the internal side 306 of the panel 300, they snap radially outward thereby securing the inspection plug 102 to the panel 300. One benefit of this embodiment is that an inspection plug 102 may be quickly inserted into pre-existing holes 304 without panel 300 modification or manipulation.

Figure 10:
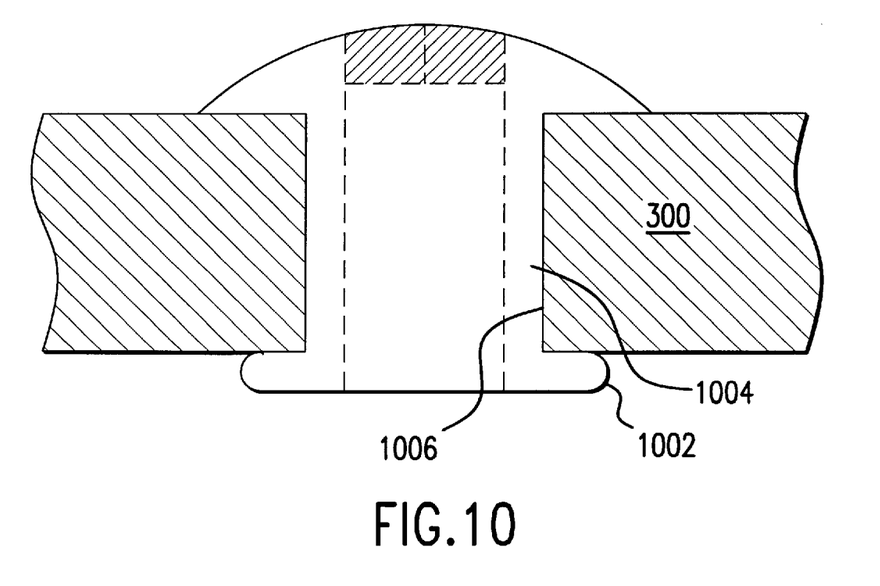
FIG. 10 is a cross-sectional side view of an alternate embodiment of the inspection plug, attached to a panel with a rivet-like deformation of the plug.

The inspection plug may also be attached to the panel 300 through a solid impact riveting process as shown in FIG. 10. In this embodiment, the cylindrical member is formed of a malleable metal. In solid impact riveting, a compressive axial load is applied to the end of the rivet shank 1004 (here, the cylindrical body) causing the shank 1004 to swell throughout its length as it shortens under the load. The rivet shank 1004 continues to expand until the walls 006 of the panel port or bole 304 restrict the shank 1004 from further radial expansion. The unrestricted rivet end outside the panel port or hole 304 then expands, forming a rivet clinch 1002 which secures the cylindrical member to the panel 300.

Figure 11A:
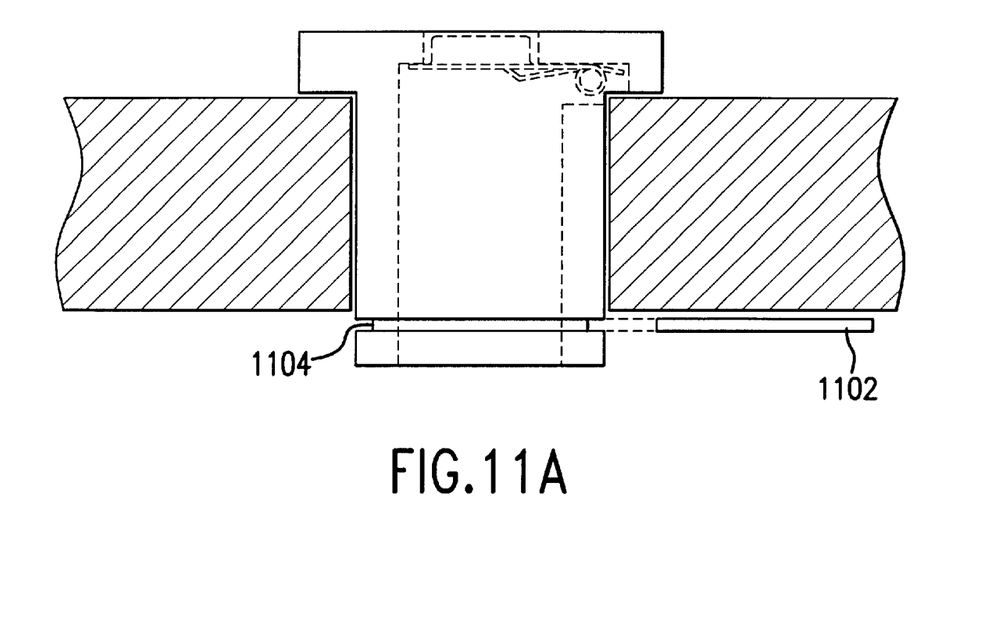
FIG. 11A is a cross-sectional side view of an alternate embodiment of the inspection plug, adapted for attachment to a panel by a C-ring.
Figure 11B:
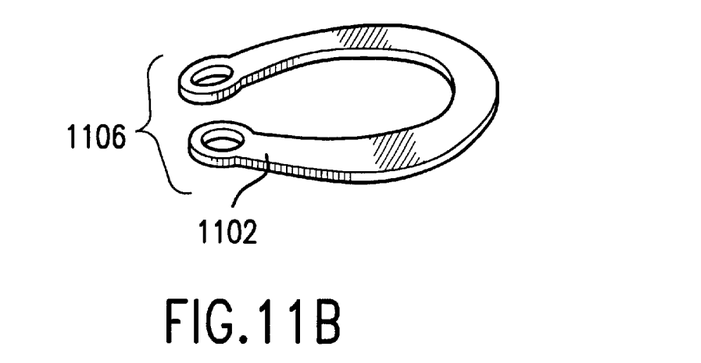
FIG. 11B is a perspective view of a representative C-ring for use with the embodiment of FIG. 11A.

In another embodiment, the plug shown in FIG. 11A may be attached to the panel using a "C-ring," which is illustrated in FIG. 11B. In this embodiment, the C-ring 1102 is a solid flexible or malleable semi-circular disc made of plastic, stainless steel, aluminum or a composite material. The C-ring 1102 is sized for engaging a circular groove 1104 in the outer wall of the cylindrical member which extends around the cylindrical member parallel to the top end 110 and the bottom end 112 of the body 104. The circular groove 1104 is oriented on the cylindrical member such that the distance between the downwardly facing side 124 of the peripheral shoulder 106 and the circular groove 1104 is equal to or slightly greater than the width of the panel 300. To attach the plug to the panel 300, the plug is inserted into the hole 304 in the panel 300. The open end 1106 of the C-ring 1102 is then aligned with the circular groove 1104 and pressed against the cylindrical member until the C-ring 1102 snaps onto the cylindrical member and rests partially within the circular groove 1104.

In various alternate embodiments, the cap 108 may be situated at or near the bottom end 112 of the body 104. Similarly, the peripheral shoulder 106 may be situated at the bottom end 112 of the body 104. Accordingly, the nut assembly or other attaching mechanism may be located at the top end 110 of the body 104.

Figure 12A:
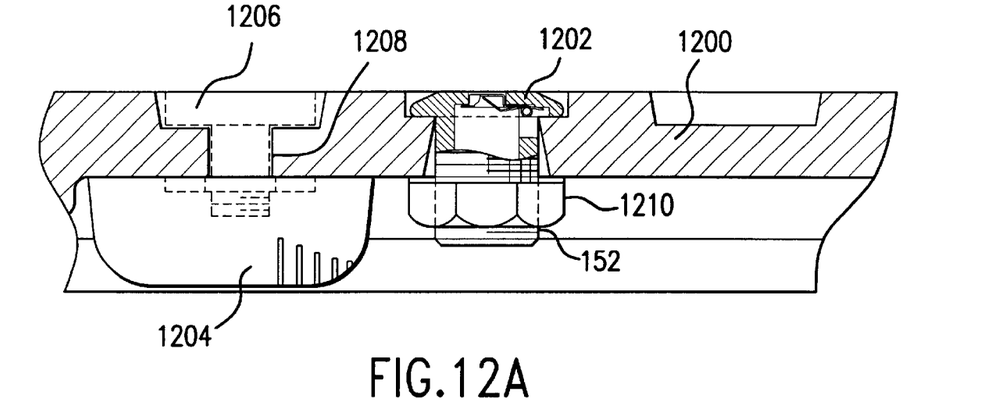
FIG. 12A is a perspective view of the inspection plug with an alarm adjacent thereto.
Figure 12B:
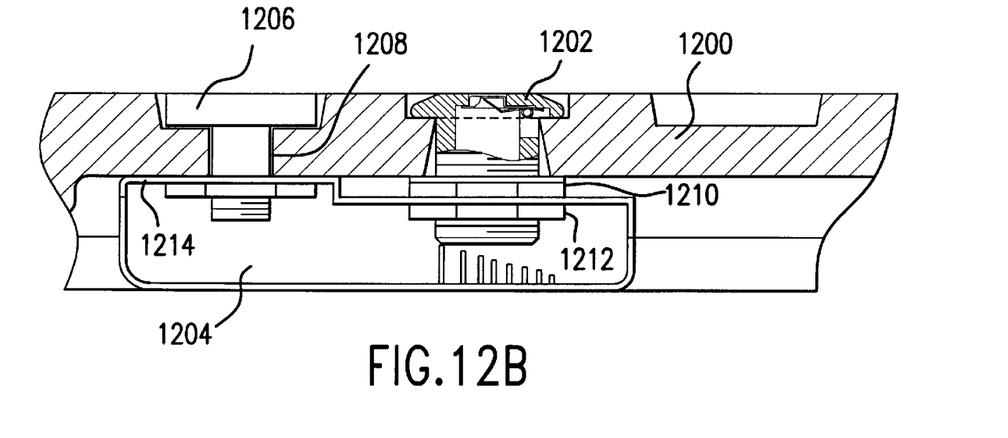
FIG. 12B is a perspective view of an alarm attached to the inspection plug.

The inspection plug may be used in conjunction with an alarm system as illustrated in FIG. 12A. An alarm 1204, which may detect toxic, flammable or combustible gases or detect the buildup of a particular gas, is also attached to the panel wall 1200 in close proximity to the inspection plug. Alternatively, the alarm 1204 may be positioned directly over the interior portion of the inspection plug as shown in FIG. 12B. Additionally, the alarm 1204 may have a warning light 1206 which passes through a second hole 1208 in the panel. The warning light may indicate that a concentration of a certain gas has been exceeded or that the battery is low, or that no source exists. By orienting the alarm and the inspection plug together or near one another, a user can easily test the internal atmosphere of an area requiring inspection. For example, if the alarm detects that a certain concentration of an undesirable (or desirable) gas has been exceeded, the alarm sounds and/or the warning light becomes lit thereby informing the user that the predetermined gas concentration has been exceeded. Subsequently, the user may insert an inspection probe into the inspection plug to inspect the contents of the internal atmosphere and measure the concentration of gaseous mixture therein.

The alarm 1204 and inspection plug 1202 combination may be attached to a panel wall 1200 through any of the above-described attaching methods. As shown in FIG. 12A, a first nut 1210 may be used to attach the plug to the panel. If the alarm 1204 is placed directly over the inspection plug, a second nut 1212 may be used to secure the alarm wall 1214 to the inspection plug 1202 as shown in FIG. 12B.

Having described the invention in detail, those skilled in the art will appreciate that modifications may be made without departing from the spirit and scope of the invention. Therefore, it should be understood that the scope of the invention is not limited to the specific embodiments illustrated and described but is defined in the appended claims.

I claim:

1. An inspection closure assembly, comprising:
   a panel consisting of one of a manhole cover or electrical connection box having an opening;
   an inspection plug received within said opening and extending there through, said plug comprising a plug body having a passageway extending between first and second ends thereof and terminating at the first end in a probe-receiving port; and
   a closure member extending into the probe-receiving port, the closure member being yieldable to a degree sufficient to admit the insertion of an inspection device through the port without the inspection plug removal.

2. The Assembly of claim 1, wherein said panel comprises a wall of an enclosure.

3. The assembly of claim 1, wherein said body has an outwardly directed flange at said first end.

4. The assembly of claim 3, wherein said body further comprises a flexible prong proximate to said second end for securing said plug to said panel, said prong including:
   a flexible shaft terminating in a flange extending outwardly from said passageway.

5. The assembly of claim 3, wherein at least a portion of said second end of said body has a threaded outer surface.

6. The assembly of claim 5, further comprising:
   a threaded nut for engagably receiving said threaded outer surface.

7. The assembly of claim 3, wherein a groove is oriented around said plug body, said assembly further comprising:
   a retaining ring at least partially within said groove.

8. The assembly of claim 7, wherein said retaining ring is a C-ring.

9. The assembly of claim 1, further comprising:
   a detection device coupled to said panel.

10. The assembly of claim 9, wherein the detection device includes an alarm.

11. The assembly of claim 1, further comprising:
    a detection device coupled to said plug.

12. The assembly of claim 11, wherein the detection device includes an alarm.

13. The assembly of claim 1, further comprising:
    means for attaching said plug to said panel.

14. The assembly of claim 1, wherein said closure member is a cap member.

15. The assembly of claim 14, wherein said cap member is hat shaped.

16. The assembly of claim 14, wherein the cap member may be opened inwardly within said body.

17. The assembly of claim 1, further comprising an elastic recoil member for providing a biasing force to said closure member, wherein said elastic recoil member has a portion secured to said closure member and an end portion received within said plug body.

18. The assembly of claim 17, wherein the elastic recoil member is a spring member providing the biasing force to said closure member.

19. The assembly of claim 18, wherein said spring member is made from at least a single piece of pliable-material having memory.

20. The assembly of claim 18, wherein said spring member includes a coil-shaped portion.

21. The assembly of claim 17, wherein the elastic recoil member and said closure member are united as one member and an end portion is received within said plug body.

22. A method of assembling a panel consisting of one of a manhole cover or electrical connection box with an inspection plug, said panel having first and second surfaces and an opening extending therethrough, said method comprising:

provisioning an inspection plug, said inspection plug including a plug body defining therein a passageway extending between the ends thereof and terminating at one of said ends in a probe-receiving port, and having a resiliently movable closure member extending into said probe-receiving port and located within said passageway for closing and opening said By probe receiving port without the inspection plug removal;

inserting a portion of the other of said ends of said body into said panel opening; and securing the plug in the panel opening.

23. The method of claim 22, wherein said panel comprises a wall of an enclosure.

24. The method of claim 22, wherein a portion of said other end of said body extends outside of said panel, said method further comprising:

axially compressing said body to cause said body to expand radially outward as said body shortens; and expanding said portion of said second end of said body extending outside of said panel thereby forming a rivet clinch.

25. The method of claim 22, wherein:

at least a portion of said other end of said plug has a threaded outer surface for engagably receiving a threaded nut;

the panel has an accessible side and a generally inaccessible side;

the plug has an outwardly extending flange at said one end that is dimensioned to engage the accessible side of the panel; and the plug is secured in said panel opening by threading and tightening the nut against the inaccessible side of the panel.

26. The method of claim 22, wherein at least a portion of said other end of said plug includes a flexible prong, said prong including a flexible shaft terminating in a flange, said flange directed radially outward from said passageway, said method further comprising:

causing said shaft to flex radially inward as said plug is inserted into said panel opening; and causing said shaft to flex radially outward as said flange passes said second surface of said panel.

27. The method of claim 22, further comprising:

attaching a detection device to said panel.

28. The method of claim 22; further comprising:

attaching a detection device to said plug.

29. The method of claim 22, wherein said plug body includes an outwardly extending flange at said one end and a groove oriented around said plug body, and said securing comprises orienting a retaining ring at least partially within said groove.

30. The method of claim 29, wherein said retaining ring is a C-ring.

31. The method of claim 22, further comprising an elastic recoil member for providing a biasing force to said closure member, wherein said elastic recoil member has a portion secured to said closure member and an end portion received within said plug body.

32. The method of claim 31, wherein the elastic recoil member is a spring member providing the biasing force to said closure member.

33. The method of claim 32, wherein said spring member is made from at least a single piece of pliable-material having memory.

34. The method of claim 32, wherein said spring member includes a coil-shaped portion.

35. The method of claim 31, wherein the elastic recoil member and said closure member are united as one member and an end portion is received within said plug body.

* * * * *